(12) United States Patent
Mori et al.

(10) Patent No.: US 11,940,007 B2
(45) Date of Patent: Mar. 26, 2024

(54) TUBULAR BODY USED FOR POWER TRANSMISSION SHAFT AND POWER TRANSMISSION SHAFT

(71) Applicant: Hitachi Astemo, Ltd., Ibaraki (JP)

(72) Inventors: Kenichi Mori, Ibaraki (JP); Takahiro Nakayama, Ibaraki (JP); Kazuki Ohta, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 405 days.

(21) Appl. No.: 17/195,287

(22) Filed: Mar. 8, 2021

(65) Prior Publication Data

US 2021/0190133 A1 Jun. 24, 2021

Related U.S. Application Data

(63) Continuation of application No. PCT/JP2019/010024, filed on Mar. 12, 2019.

(30) Foreign Application Priority Data

Feb. 27, 2019 (JP) .................................. 2019-033412

(51) Int. Cl.
*F16C 3/02* (2006.01)
*F16D 9/08* (2006.01)

(52) U.S. Cl.
CPC ............... *F16C 3/026* (2013.01); *F16D 9/08* (2013.01); *F16C 2208/02* (2013.01); *F16C 2326/06* (2013.01)

(58) Field of Classification Search
CPC .. F16C 3/026; F16C 2208/02; F16C 2326/06; F16D 9/08

(Continued)

(56) References Cited

U.S. PATENT DOCUMENTS

| 724,684 A | * | 4/1903 | Edwards | ................... F16D 9/06 464/32 |
| 5,836,825 A | * | 11/1998 | Yamane | .................. F16D 3/387 464/181 |
| 6,190,263 B1 | | 2/2001 | Kimoto et al. | |

FOREIGN PATENT DOCUMENTS

| JP | H05-87323 U | 11/1993 |
| JP | H07-208445 A | 8/1995 |

(Continued)

OTHER PUBLICATIONS

International Search Report and Written Opinion of the International Search Report for PCT/JP2019/010024 dated Jun. 18, 2019.

(Continued)

*Primary Examiner* — Greg Binda
(74) *Attorney, Agent, or Firm* — Kenealy Vaidya LLP

(57) ABSTRACT

A tube is used in fiber-reinforced plastic power transmission shaft. The tube comprises: a cylindrical body section; a connection portion that has a larger diameter than the body section; and an inclined portion that has an outer diameter that increases toward the second connection section from the main body part. The inclined section has formed thereon, a weak section that is damaged when a load input in the axial direction exceeds a prescribed value. With this configuration, the cost of the tube can be reduced, and when a prescribed load is input to the tube in the axial direction, the tube is reliably damaged.

1 Claim, 10 Drawing Sheets

(58) Field of Classification Search
USPC .......................... 464/32, 181–183; 280/777
See application file for complete search history.

(56) References Cited

FOREIGN PATENT DOCUMENTS

| | | |
|---|---|---|
| JP | H09-68214 A | 3/1997 |
| JP | H09-175202 A | 7/1997 |
| JP | H11-78564 A | 3/1999 |
| JP | 2001-355626 A | 12/2001 |
| WO | 2020/174691 A1 | 9/2020 |

OTHER PUBLICATIONS

Japanese Office Action (Notice of Reasons for Refusal) for the related Japanese Patent Application No. 2019-033412 dated Mar. 25, 2019.

\* cited by examiner

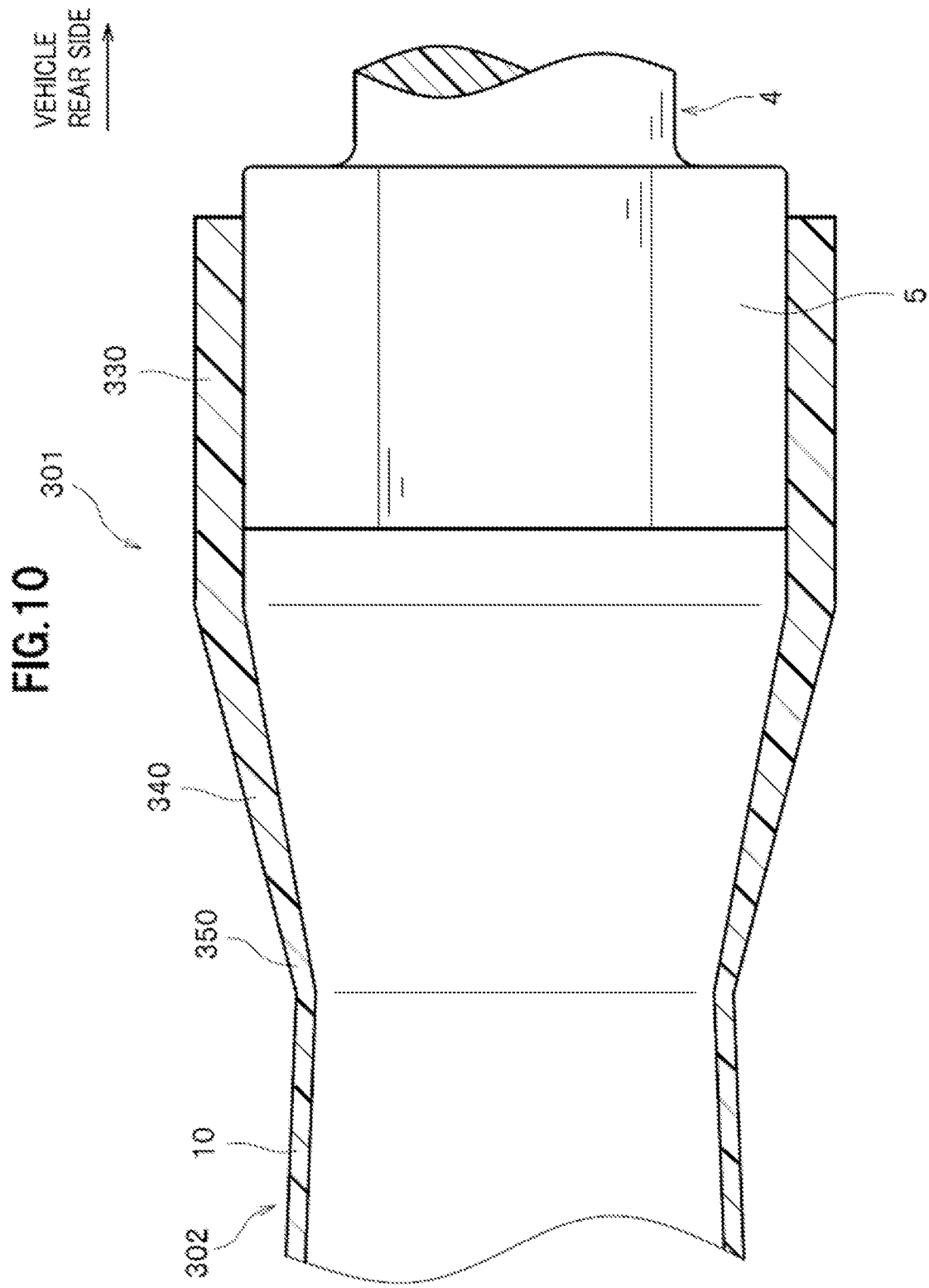

TUBULAR BODY USED FOR POWER TRANSMISSION SHAFT AND POWER TRANSMISSION SHAFT

CROSS-REFERENCE TO RELATED APPLICATION

This application is a PCT Bypass Continuation application of and claims the priority benefit under 35 U.S.C. § 120 to PCT application No. PCT/JP2019/010024, filed on Mar. 12, 2019 and therefore also claims the priority benefit under 35 U.S.C. § 119 of Japanese Patent Application No. 2019-033412, filed on Feb. 27, 2019, the entire contents of each of PCT application No. PCT/JP2019/010024 and Japanese Patent Application No. 2019-033412 is incorporated herein by reference.

TECHNICAL FIELD

The present invention relates to a tubular body used in a power transmission shaft and to a power transmission shaft.

BACKGROUND ART

A power transmission shaft (propeller shaft) mounted in a vehicle extends in a front-rear direction of the vehicle and transmits power, generated in a motor and subjected to speed reduction in a transmission, to a final drive gear. As such a power transmission shaft, there is a shaft made of a fiber reinforced plastic.

As a tubular power transmission shaft made of a fiber reinforced plastic, there is a shaft which includes a main body portion, a connection portion having a larger diameter than the main body portion, and an inclined portion formed between the main body portion and the connection portion and in which a shaft portion of a universal joint is fitted into the connection portion (see, for example, Patent Literature 1).

In the aforementioned power transmission shaft, when a vehicle is hit from the front side and impact load exceeding a predetermined value is inputted into the power transmission shaft, the shaft portion slides relative to the connection portion and abuts on an inner surface of the inclined portion and the inclined portion thereby fails. This causes an engine and a transmission mounted in a front portion of a vehicle body to quickly retreat and the front portion of the vehicle body absorbs impact energy.

Moreover, as another configuration of the power transmission shaft, there is a configuration in which a peripheral wall portion of a connection portion is formed of multiple layers and, when impact load exceeding a predetermined value is inputted into the power transmission shaft, an inner layer portion of the connection portion peels off and moves together with a shaft portion (see, for example, Patent Literature 2).

CITATION LIST

Patent Literature

Patent Literature 1: Japanese Patent Application Publication No. H09-175202

Patent Literature 2: Japanese Patent Application Publication No. H07-208445

SUMMARY OF INVENTION

Technical Problem

In the configuration in which the shaft portion slides relative to the connection portion only when the impact load exceeding the predetermined value is inputted out of the aforementioned conventional power transmission shafts, joining force between the connection portion and the shaft portion needs to be accurately set. To this end, the dimensions of the connection portion and the shaft portion need to be accurately molded and this causes a problem of an increase in manufacturing cost.

Moreover, in the configuration in which the inner peripheral portion of the connection portion peels off together with the shaft portion in impact out of the aforementioned conventional power transmission shafts, the peripheral wall portion of the connection portion is formed of multiple layers and this causes a problem of an increase in manufacturing cost.

An object of the present invention is to solve the aforementioned problems and provide a tubular body used in a power transmission shaft and a power transmission shaft that can achieve low cost and that surely fail when predetermined load is inputted in a direction of an axis.

Solution to Problem

A first aspect of the present invention for solving the aforementioned problems is a tubular body used in a power transmission shaft that transmits power by rotating and that is made of a fiber reinforced plastic. The tubular body includes: a tubular main body portion that is centered at an axis; a connection portion which has a smaller diameter than the main body portion and to which a coupling member is joined; and an inclined portion that is formed between the main body portion and the connection portion and that decreases in outer diameter while extending from the main body portion toward the connection portion. A weak portion that fails when load inputted in an axial direction exceeds a predetermined value is formed in the inclined portion.

A second aspect of the present invention for solving the aforementioned problems is a tubular body used in a power transmission shaft that transmits power by rotating and that is made of a fiber reinforced plastic. The tubular body includes: a tubular main body portion that is centered at an axis; a connection portion which has a larger diameter than the main body portion and to which a coupling member is joined; and an inclined portion that is formed between the main body portion and the connection portion and that increases in outer diameter while extending from the main body portion toward the connection portion. A weak portion that fails when load inputted in an axial direction exceeds a predetermined value is formed in the inclined portion.

A third aspect of the present invention for solving the aforementioned problems is a power transmission shaft and includes: the aforementioned tubular body used in the power transmission shaft; and the coupling member joined to the connection portion.

Advantageous Effects of Invention

In the power transmission shaft including the tubular body used in the power transmission shaft of the present invention, when load is inputted in the axial direction, shear force acts on the inclined portion. Then, when the shear force acting on the inclined portion exceeds a predetermined value, the weak portion of the inclined portion fails. In this configuration, there is no need to accurately set joining force between the connection portion and the coupling member and molding of the connection portion is facilitated.

Accordingly, in the tubular body used in the power transmission shaft and the power transmission shaft of the present invention, facilitation of molding of the connection portion can achieve cost reduction. Moreover, forming the weak portion in the inclined portion causes the weak portion to surely fail by input of predetermined load in the axial direction.

Furthermore, in the tubular body used in the power transmission shaft and the power transmission shaft in the first aspect of the present invention, the outer diameter of the connection portion is small and the weight and cost can be thus reduced.

BRIEF DESCRIPTION OF DRAWINGS

FIG. 10 is a side cross-sectional view illustrating an inclined portion of the power transmission shaft in the fourth embodiment.

DESCRIPTION OF EMBODIMENTS

Figure 1:
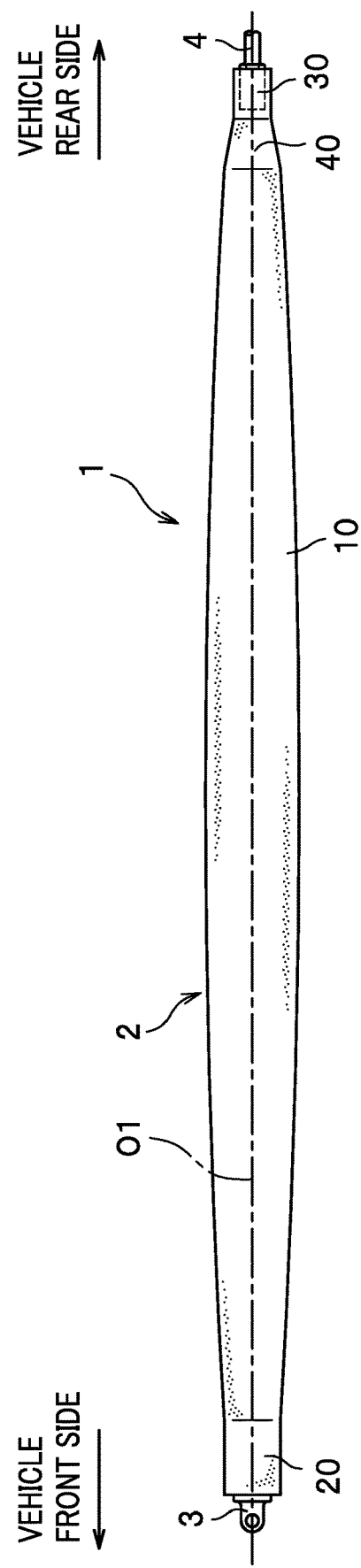
FIG. 1 is a side view illustrating a power transmission shaft of a first embodiment.

Next, a tubular body and a power transmission shaft in each of embodiments are described with reference to the drawings. Note that, in each embodiment, description is given of an example in which the power transmission shaft of the present invention is applied to a propeller shaft mounted in a FF (front-engine, front-drive)-based four-wheel drive vehicle. Moreover, technical elements common among the embodiments are denoted by the same reference numerals and description thereof is omitted.

First Embodiment

As illustrated in FIG. 1, a power transmission shaft 1 of a first embodiment includes a substantially-cylindrical tubular body 2 (pipe) that extends in a front-rear direction of the vehicle. Moreover, the power transmission shaft 1 includes a stub yoke 3 of a Cardan joint joined to a front end of the tubular body 2 and a stub shaft 4 ("coupling member" in the scope of claims) of a constant-velocity joint joined to a rear end of the tubular body 2.

The power transmission shaft 1 is coupled to a transmission, mounted in a front portion of a vehicle body, via the stub yoke 3 and is also coupled to a final drive gear, mounted in a rear portion of a vehicle body, via the stub shaft 4.

When power (torque) is transmitted from the transmission to the power transmission shaft 1, the power transmission shaft 1 rotates about an axis O1 and the power is transmitted to the final drive gear.

The tubular body 2 is made of a carbon fiber reinforced plastic (CFRP). Note that reinforcement fibers used in the fiber reinforced plastic of the present invention are not limited to carbon fibers and may be glass fibers or aramid fibers.

A method of manufacturing the tubular body 2 is such that a continuous carbon fiber is wound around a not-illustrated mandrel to form a molded body and then a pre-preg (sheet obtained by impregnating carbon fibers with a resin) is wound around an outer periphery of the molded body. Accordingly, the power transmission shaft 1 is manufactured by incorporating two crafting methods of the filament winding method and the sheet winding method.

In this case, the molded body manufactured by the filament winding method has high mechanical strength (particularly, torsional strength) because the continuity of the fiber (carbon fiber) is maintained.

Meanwhile, in the sheet winding method, the carbon fibers can be arranged to extend in an axial direction of the mandrel. Thus, the molded body with high elasticity in the axis O1 direction can be manufactured.

Specifically, in the aforementioned manufacturing method, a fiber layer made of a fiber wound about the axis O1 and a fiber layer made of fibers extending in the axis O1 direction are stacked one on top of the other in the tubular body 102 and the tubular body 2 with high mechanical strength and high elasticity in the axis O1 direction can be manufactured.

Note that a PAN (polyacrylonitrile) based fiber is preferable as the fiber aligned in a circumferential direction and pitch fibers are preferable as the fibers aligned in the axis O1 direction.

The method of manufacturing the tubular body 2 of the present invention is not limited to the manufacturing method described above. As a method of manufacturing the tubular body 2, it is possible to employ a method in which a pre-preg is wound around a mandrel to form a molded body and a continuous carbon fiber is wound around an outer periphery of the molded body. Alternatively, one type of manufacturing method (filament winding method or sheet winding method) may be used as the manufacturing method of the tubular body 2.

Figure 2:
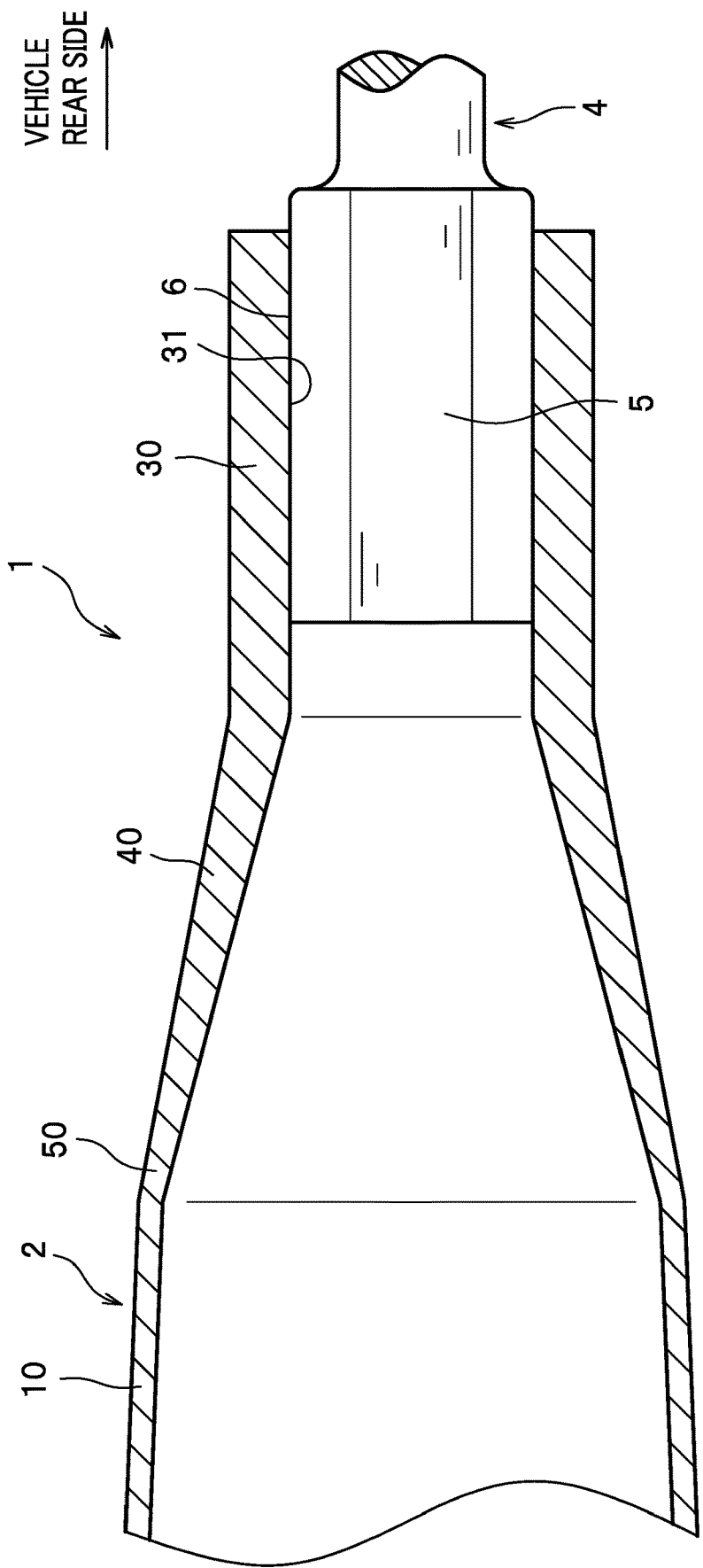
FIG. 2 is a side cross-sectional view illustrating an inclined portion of the power transmission shaft in the first embodiment.

The tubular body 2 includes a tubular main body portion 10 having the axis O1 as a center axis, a first connection portion 20 arranged in front of the main body portion 10, a second connection portion 30 arranged behind the main body portion 10, and an inclined portion 40 formed between the main body portion 10 and the second connection portion 30. Moreover, in the tubular body 2, as illustrated in FIG. 2, a weak portion 50 is formed in the inclined portion 40.

When the main body portion 10 illustrated in FIG. 1 is cut along a plane whose normal is the axis O1, a cross-sectional shape of an outer peripheral surface of the main body portion 10 is a circular shape.

Moreover, the main body portion 10 decreases in outer diameter while extending from a center portion toward both end portions and the outer diameter in the center portion is larger than the outer diameters in both end portions.

Specifically, when the main body portion 10 is cut along the axis O1, the cross-sectional shape of the outer peripheral surface of the main body portion 10 is an arc shape that forms gentle curves and protrudes outward. Thus, the outer shape of the main body portion 10 is a barrel shape having a center portion bulging outward in a radial direction.

Although the cross-sectional shape of the outer peripheral surface of the main body portion 10 in the case where the main body portion 10 is cut along the axis O1 is the arc shape in the tubular body 2 of the first embodiment, the cross-sectional shape of the outer peripheral surface of the main body portion 10 may be formed to be a step shape in the present invention.

Alternatively, the cross-sectional shape of the outer peripheral surface of the main body portion 10 in the case where the main body portion 10 is cut along the axis O1 may be linearly inclined to come closer toward the center while extending from the center portion toward both end portions. In other words, the main body portion 10 may be formed to have a rhombus shape in a side view.

A shaft portion (not illustrated) of the stub yoke 3 is fitted into the first connection portion 20. An inner peripheral surface of the first connection portion 20 has a polygonal shape following a polygonal outer peripheral surface of the shaft portion of the stub yoke 3. The tubular body 2 and the stub yoke 3 are thus configured not to rotate relative to each other.

As illustrated in FIG. 2, a shaft portion 5 of the stub shaft 4 is fitted into the second connection portion 30.

An inner peripheral surface 31 of the second connection portion 30 has a polygonal shape following a polygonal outer peripheral surface 6 of the shaft portion 5 of the stub shaft 4. The tubular body 2 and the stub shaft 4 are thus configured not to rotate relative to each other.

Although the inner peripheral shape of the second connection portion 30 is formed to be the polygonal shape in the first embodiment, the inner peripheral shape is not limited to this shape and is formed to match the shape of the outer peripheral surface 6 of the shaft portion 5 in the present invention.

The outer diameter of the second connection portion 30 is formed to correspond to the outer diameter of the shaft portion 5 of the stub shaft 4 and is smaller than the diameter of a rear end portion of the main body portion 10.

Note that reducing the diameter of the second connection portion 30 reduces the torsional strength thereof. Accordingly, the wall thickness of the second connection portion 30 is made larger than the wall thickness of the rear end portion of the main body portion 10 and the second connection portion 30 thus made to have predetermined torsional strength.

The inclined portion 40 is a cylindrical section formed between the main body portion 10 and the second connection portion 30. The inclined portion 40 gradually decreases in outer diameter while extending from the main body portion 10 toward the second connection portion 30 and has a truncated cone shape.

The inclined portion 40 gradually decreases in wall thickness while extending from an end portion (rear end portion, one end portion) on the second connection portion 30 side (rear side) toward an end portion (front end portion, other end portion) on the main body portion 10 side (front side). Accordingly, the wall thickness is smallest in the front end portion of the inclined portion 40 and the front end portion of the inclined portion 40 forms the weak portion 50. The weak portion 50 is a portion in which the shear strength of the inclined portion 40 is lowest.

Although the wall thickness varies over the entire inclined portion 40 in the power transmission shaft 1, the wall thickness may vary in a partial section of the inclined portion 40 in the present invention.

Figure 3:
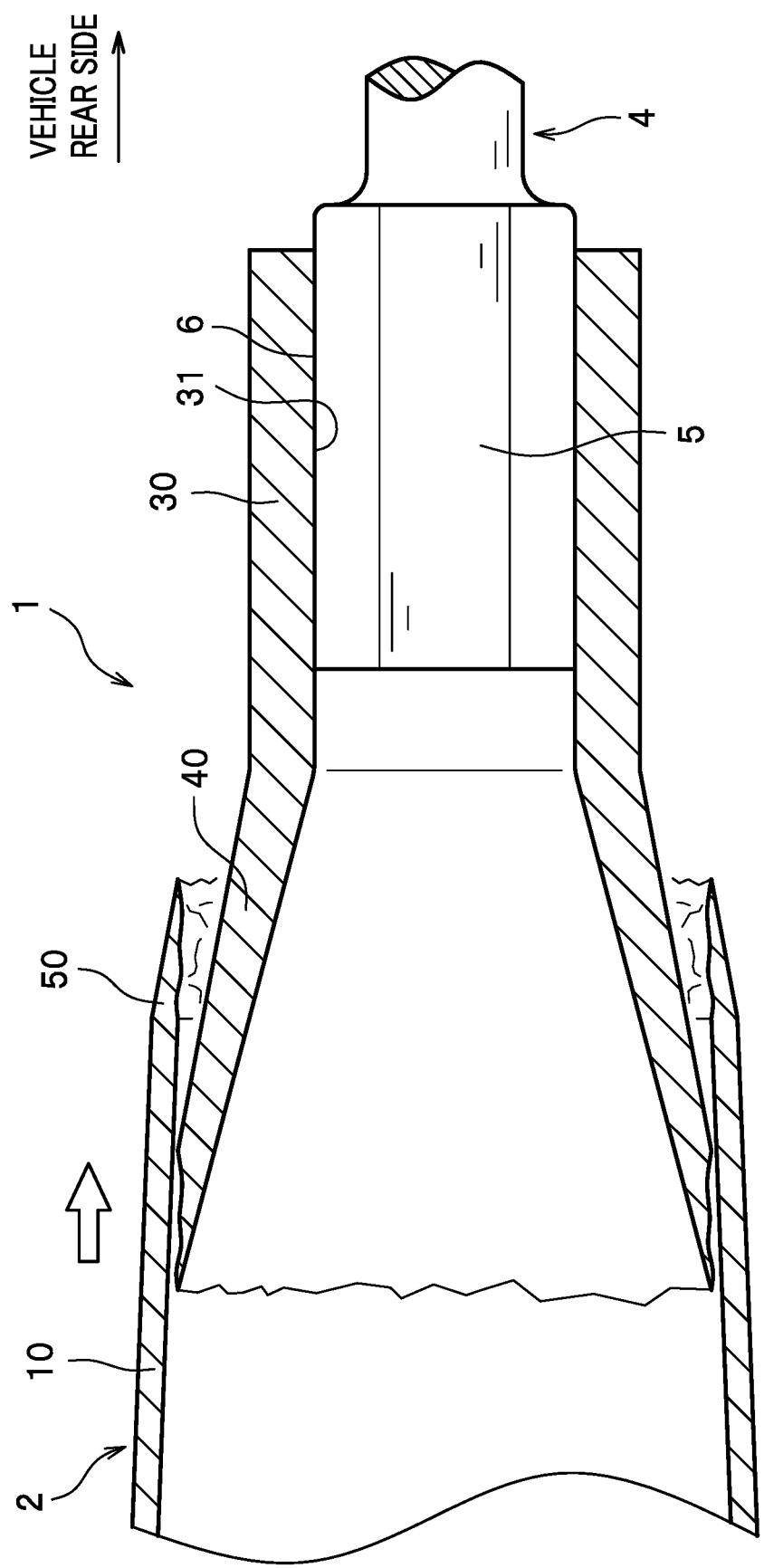
FIG. 3 is a side cross-sectional view illustrating a state where a weak portion is failed in the power transmission shaft of the first embodiment.

In the power transmission shaft 1 including the tubular body 2 of the first embodiment as described above, when the vehicle is hit from the front side and impact load is inputted into the power transmission shaft 1 in the axis O1 direction, shear force in the axis O1 direction acts on the inclined portion 40. Then, when the shear force acting on the inclined portion 40 exceeds a predetermined value, the weak portion 50 of the inclined portion 40 fails as illustrated in FIG. 3. The failing of the power transmission shaft 1 in vehicle impact thus allows the engine and the transmission mounted in the front portion of the vehicle body to quickly retreat and the front portion of the vehicle body absorbs impact energy.

Although the weak portion 50 is failed in FIG. 3, in the present invention, the weak portion 50 only needs to be configured such that, when the load inputted into the power transmission shaft 1 in the axis O1 direction exceeds the predetermined value, the length of the power transmission shaft 1 in the axial direction is reduced by the deformation of the weak portion 50.

As described above, in the tubular body 2 and the power transmission shaft 1 of the first embodiment, joining force between the second connection portion 30 and the stub shaft 4 does not have to be accurately set and the molding of the second connection portion 30 is thus facilitated. Moreover, in the tubular body 2 and the power transmission shaft 1, since the portion in which the wall thickness of the inclined portion 40 is smallest is the weak portion 50 as illustrated in FIG. 2, the weak portion 50 is easily formed in the molding of the inclined portion 40.

Thus, in the tubular body 2 and the power transmission shaft 1, the facilitation of the molding of the second connection portion 30 can reduce cost. Moreover, the weak portion 50 is formed in the inclined portion 40 and this can cause the weak portion 50 to surely fail by predetermined load inputted in the axis O1 direction.

Furthermore, in the tubular body 2 and the power transmission shaft 1, since the outer diameter of the second connection portion 30 is small as illustrated in FIG. 2, the weight and cost can be reduced.

Moreover, in the tubular body 2 and the power transmission shaft 1, since the center portion of the main body portion 10 where the bending stress tends to concentrate is formed to have a large outer diameter as illustrated in FIG. 1, the center portion has predetermined bending strength.

Furthermore, in the tubular body 2 and the power transmission shaft 1, since the tubular body 2 is made of the fiber reinforced plastic, a degree of freedom in design is high and the cost can be further reduced.

Second Embodiment

Next, a power transmission shaft 101 including a tubular body 102 according to a second embodiment of the present invention is described.

Figure 4:
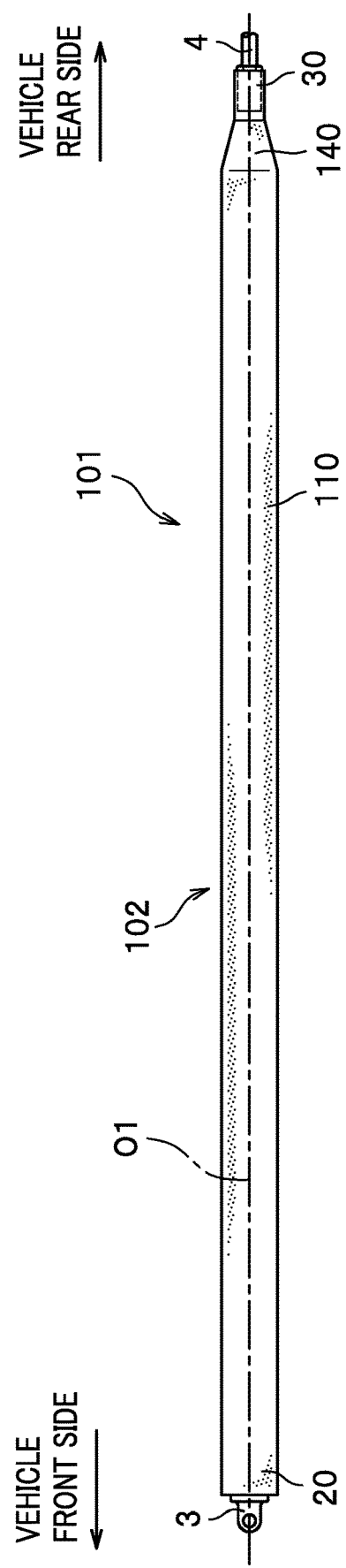
FIG. 4 is a side view illustrating a power transmission shaft of a second embodiment.

As illustrated in FIG. 4, the power transmission shaft 101 of the second embodiment includes the tubular body 102, the stub yoke 3 joined to a front end of the tubular body 102, and the stub shaft 4 joined to a rear end of the tubular body 102.

The tubular body 102 of the second embodiment includes a main body portion 110, the first connection portion 20 arranged in front of the main body portion 110, the second connection portion 30 arranged behind the main body portion 110, and an inclined portion 140 located between the main body portion 110 and the second connection portion 30. Moreover, as illustrated in FIG. 5, a weak portion 150 is formed in the inclined portion 140.

When the main body portion 110 in the second embodiment illustrated in FIG. 4 is cut along a plane whose normal is the axis O1, a cross-sectional shape of an outer peripheral surface of the main body portion 110 is a circular shape. The main body portion 110 has a uniform outer diameter from a front end portion to a rear end portion. Specifically, the outer shape of the main body portion 110 in the second embodiment is a straight cylindrical body.

Figure 5:
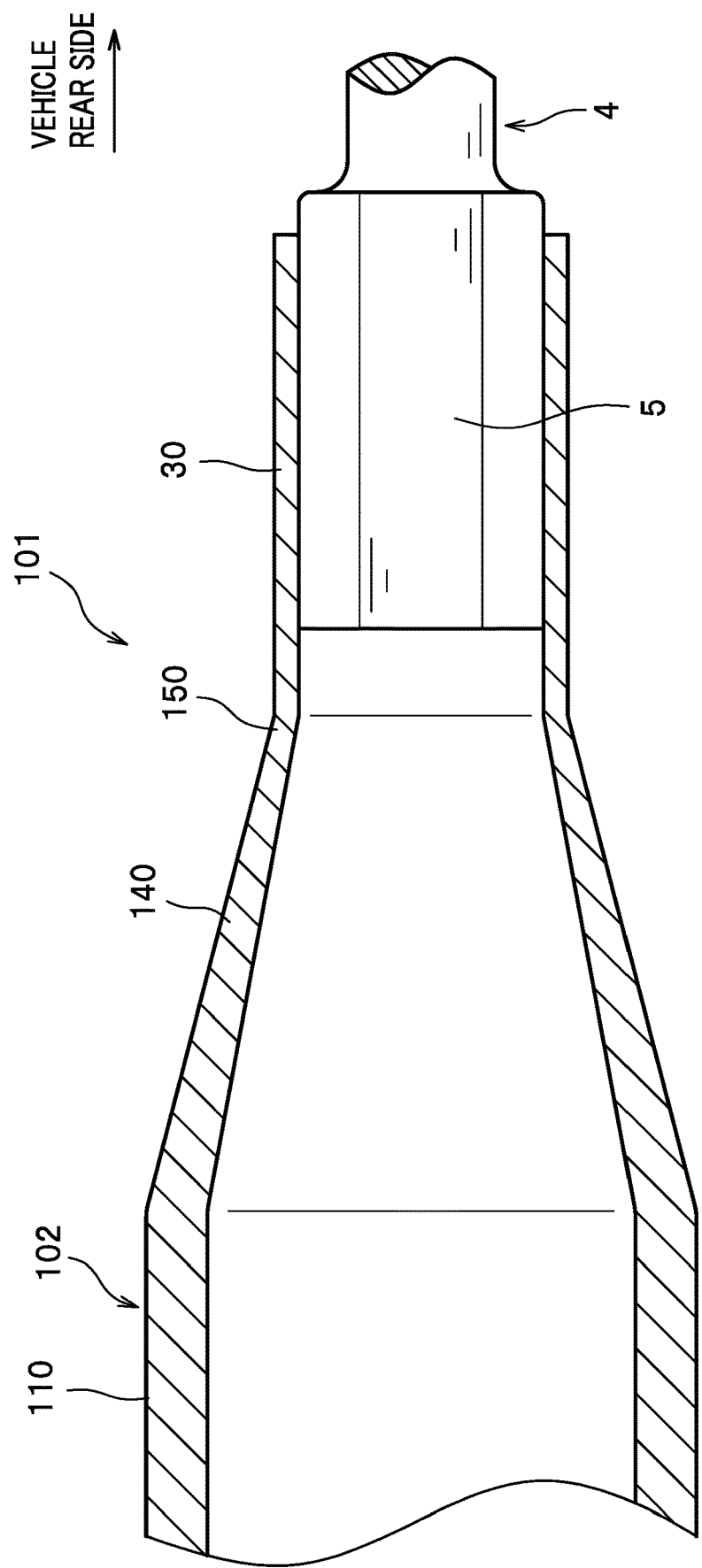
FIG. 5 is a side cross-sectional view illustrating an inclined portion of the power transmission shaft in the second embodiment.

As illustrated in FIG. 5, the inclined portion 40 in the second embodiment gradually decreases in wall thickness while extending from an end portion (front end portion, other end portion) on the main body portion 10 side (front side) toward an end portion (rear end portion, one end portion) on the second connection portion 30 side (rear side). Accordingly, the wall thickness is smallest in the rear end portion of the inclined portion 40 and the rear end portion of the inclined portion 140 forms the weak portion 150.

Figure 6:
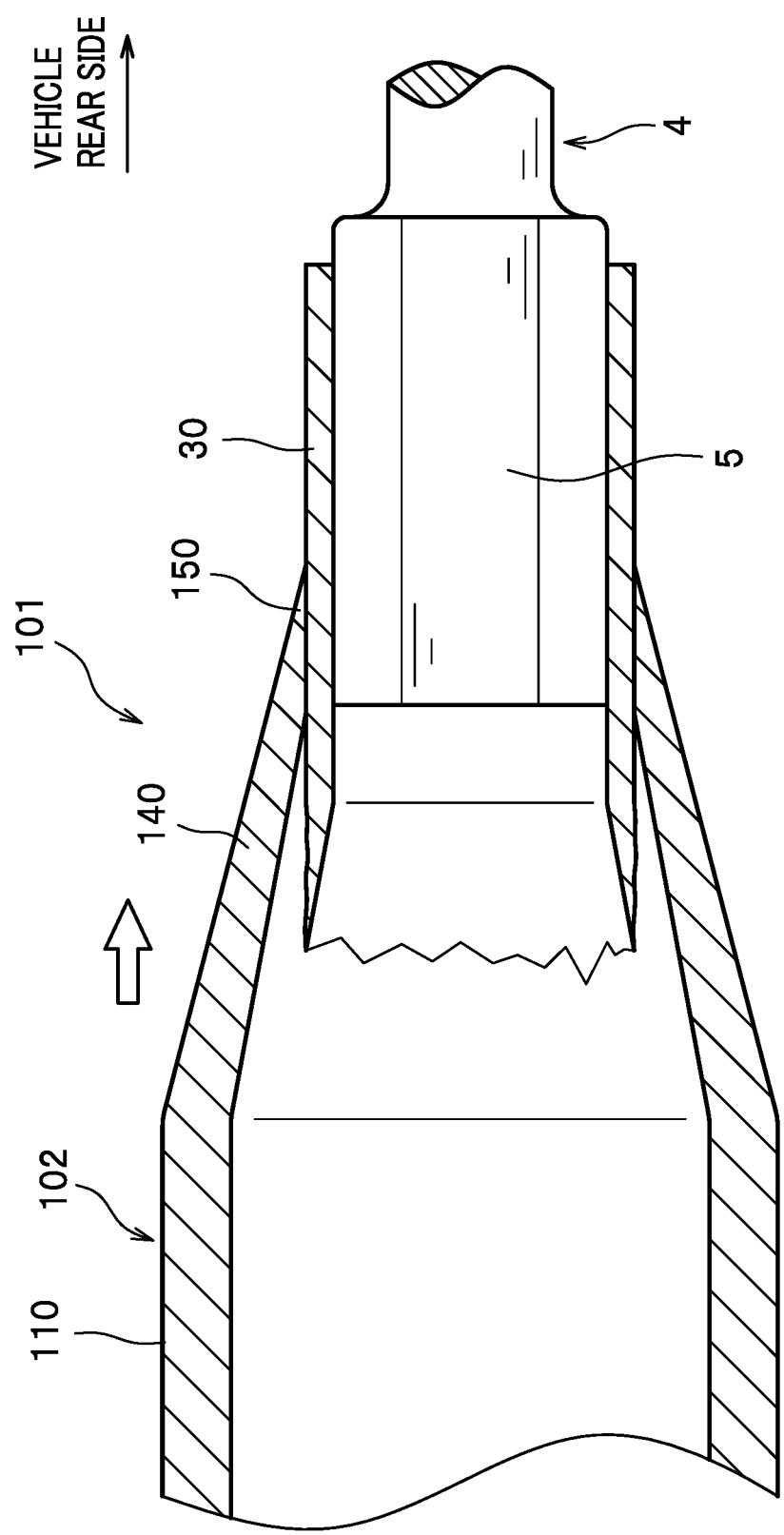
FIG. 6 is a side cross-sectional view illustrating a state where a weak portion is failed in the power transmission shaft of the second embodiment.

In the power transmission shaft 101 including the tubular body 102 of the second embodiment as described above, when the vehicle is hit from the front side and shear force acting on the inclined portion 140 exceeds a predetermined value, the weak portion 150 of the inclined portion 140 fails as illustrated in FIG. 6. Then, the engine and the transmission mounted in the front portion of the vehicle body quickly retreat and the front portion of the vehicle body absorbs impact energy.

As described above, in the tubular body 102 and the power transmission shaft 101 of the second embodiment illustrated in FIG. 5, it is possible to facilitate molding of the second connection portion 30 as in the power transmission shaft 1 (see FIG. 2) of the first embodiment and, in addition, to facilitate the molding of the main body portion 110. Accordingly, the cost can be reduced.

Moreover, in the tubular body 102 and the power transmission shaft 101 of the second embodiment, the weak portion 150 is formed in the inclined portion 140 and this can cause the weak portion 150 to surely fail by predetermined load inputted in the axis O1 direction.

Third Embodiment

Next, a power transmission shaft 201 including a tubular body 202 according to a third embodiment of the present invention is described.

Figure 7:
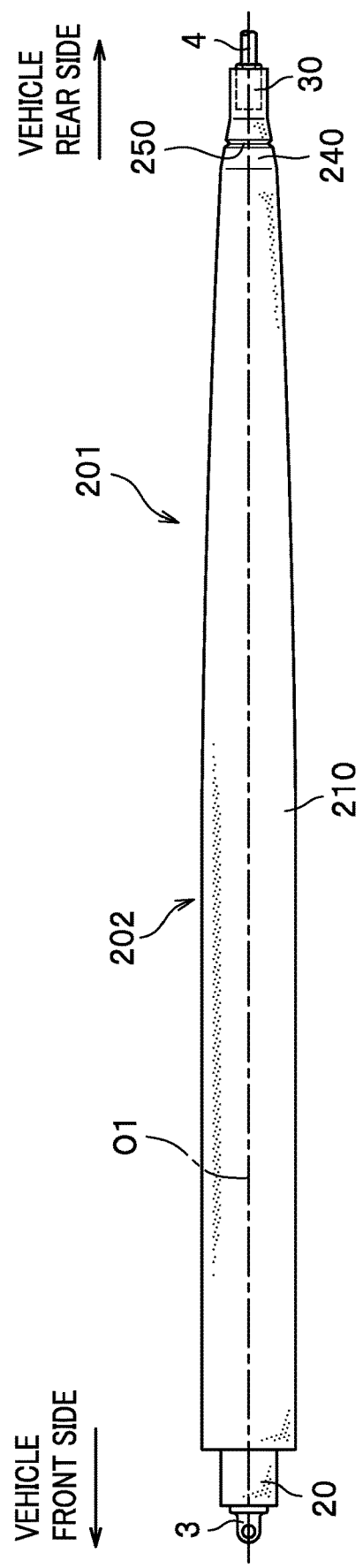
FIG. 7 is a side view illustrating a power transmission shaft of a third embodiment.

As illustrated in FIG. 7, the power transmission shaft 201 of the third embodiment includes the tubular body 202, the stub yoke 3 joined to a front end of the tubular body 202, and the stub shaft 4 joined to a rear end of the tubular body 202.

Figure 8:
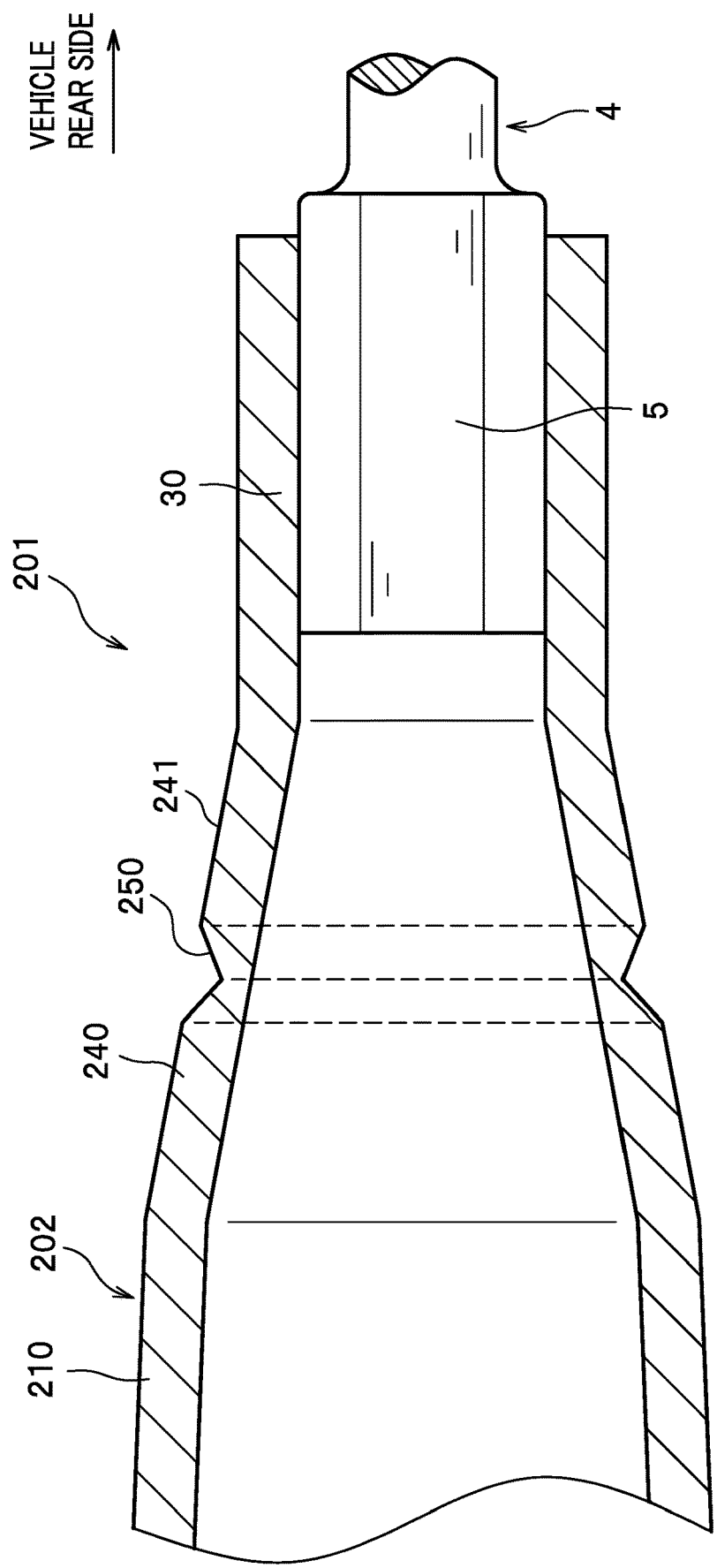
FIG. 8 is a side cross-sectional view illustrating an inclined portion of the power transmission shaft in the third embodiment.

The tubular body 202 of the third embodiment includes a main body portion 210, the first connection portion 20 arranged in front of the main body portion 210, the second connection portion 30 arranged behind the main body portion 210, and an inclined portion 240 located between the main body portion 210 and the second connection portion 30. Moreover, as illustrated in FIG. 8, a weak portion 250 is formed in the inclined portion 240.

When the main body portion 210 of the third embodiment illustrated in FIG. 7 is cut along a plane whose normal is the axis O1, a shape of an outer peripheral surface of the main body portion 210 is a circular shape.

The main body portion 210 is formed to have a uniform outer diameter from a front end portion to a center portion and decrease in outer diameter while extending from the center portion toward a rear end portion. Accordingly, the outer diameters in the front end portion and the center portion of the main body portion 210 are larger than the outer diameter in the rear end portion.

When the main body portion 210 is cut along the axis O1, a cross-sectional shape of an outer peripheral surface of the main body portion 210 is a linear shape from the front end portion to the center portion and is an arc shape that forms a gentle curve from the center portion to the rear end portion.

As illustrated in FIG. 8, the inclined portion 240 in the third embodiment has a uniform wall thickness from an end portion on the main body portion 210 side (front side) to an end portion on the second connection portion 30 side (rear side) except for a portion in which the weak portion 250 is formed.

The weak portion 250 is formed in an outer peripheral surface 241 of the inclined portion 240. The weak portion 250 of the third embodiment is an annular groove formed over the entire circumference of the outer peripheral surface 241 of the inclined portion 240. Forming the weak portion 250 in the outer peripheral surface 241 of the inclined portion 240 as described above partially reduces the wall thickness of the inclined portion 240.

Although the annular weak portion 250 is formed in the outer peripheral surface 241 of the inclined portion 240 in the tubular body 202 in the tubular body 202 and the power transmission shaft 201 of the third embodiment, recess-shaped weak portions may be formed in the outer peripheral surface 241 of the inclined portion 240. In this case, multiple weak portions are preferably arranged in a circumferential direction of the outer peripheral surface 241 of the inclined portion 240.

In the power transmission shaft 201 including the tubular body 202 of the third embodiment as described above, when the vehicle is hit from the front side and shear force acting on the inclined portion 240 exceeds a predetermined value, the weak portion 250 of the inclined portion 240 fails. Then, the engine and the transmission mounted in the front portion of the vehicle body quickly retreat and the front portion of the vehicle body absorbs impact energy.

As described above, in the tubular body 202 and the power transmission shaft 201 of the third embodiment illustrated in FIG. 7, the molding of the second connection portion 30 is facilitated as in the power transmission shaft 1 (see FIG. 2) of the first embodiment and the cost can be thus reduced.

Moreover, in the tubular body 202 and the power transmission shaft 201 of the third embodiment, the weak portion 250 is formed in the inclined portion 240 and this can cause the weak portion 250 to surely fail by predetermined load inputted in the axis O1 direction.

Fourth Embodiment

Next, a power transmission shaft 301 including a tubular body 302 according to a fourth embodiment of the present invention is described.

The power transmission shaft 301 of the fourth embodiment includes the tubular body 302, the stub yoke 3 joined to a front end of the tubular body 302, and the stub shaft 4 joined to a rear end of the tubular body 302.

Figure 9:
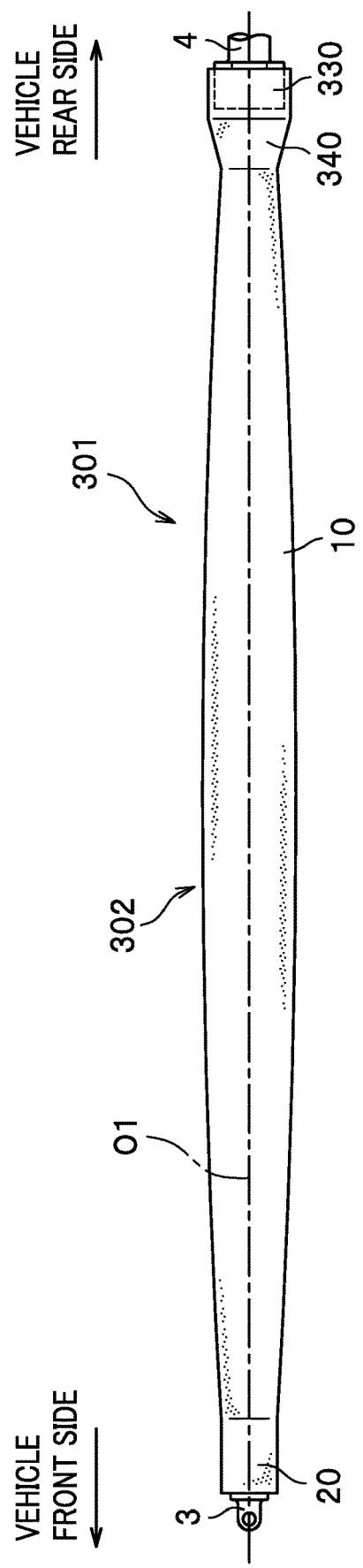
FIG. 9 is a side view illustrating a power transmission shaft of a fourth embodiment.

As illustrated in FIG. 9, the tubular body 302 of the fourth embodiment includes the main body portion 10, the first connection portion 20 arranged in front of the main body portion 10, a second connection portion 330 arranged behind the main body portion 10, and an inclined portion 340 located between the main body portion 10 and the second connection portion 330. Moreover, as illustrated in FIG. 10, a weak portion 350 is formed in the inclined portion 340.

The outer shape of the main body portion 10 in the fourth embodiment is a barrel shape having a center portion bulging outward in a radial direction as illustrated in FIG. 9.

As illustrated in FIG. 10, the outer diameter of the second connection portion 330 in the fourth embodiment is larger than the outer diameter of the rear end portion of the main body portion 10.

The inclined portion 340 in the fourth embodiment has a truncated cone shape in which the inclined portion 340 gradually increases in outer diameter while extending from the main body portion 10 toward the second connection portion 330.

The inclined portion 340 gradually decreases in wall thickness while extending from an end portion (front end portion, other end portion) on the main body portion 10 side (front side) toward an end portion (rear end portion, one end portion) on the second connection portion 330 side (rear side). Accordingly, the wall thickness is smallest in the front end portion of the inclined portion 340 and the front end portion of the inclined portion 340 forms the weak portion 350.

Note that the inclined portion 340 may decrease in wall thickness while extending from the main body portion 10 side toward the second connection portion 330.

In the power transmission shaft 301 including the tubular body 302 of the fourth embodiment as described above, when the vehicle is hit from the front side and shear force acting on the inclined portion 340 exceeds a predetermined value, the weak portion 350 of the inclined portion 340 fails. Then, the engine and the transmission mounted in the front portion of the vehicle body quickly retreat and the front portion of the vehicle body absorbs impact energy.

As described above, in the tubular body 302 and the power transmission shaft 301 of the fourth embodiment, the molding of the second connection portion 30 is facilitated as in the power transmission shaft 1 (see FIG. 2) of the first embodiment and the cost can be thus reduced.

Moreover, in the tubular body 302 and the power transmission shaft 301 of the fourth embodiment, the weak portion 350 is formed in the inclined portion 340 and this can cause the weak portion 350 to surely fail by predetermined load inputted in the axis O1 direction.

Although the embodiments are described above, the present invention is not limited to the examples described in the embodiments.

For example, in the power transmission shafts of the embodiments, the inclined portion is provided between the main body portion and the second connection portion and the weak portion is formed in the inclined portion. However, the configuration may be such that the inclined portion is provided between the main body portion and the first connection portion and the weak portion is formed in the inclined portion.

The invention claimed is:

1. A tubular body used in a power transmission shaft that transmits power by rotating and that is made of a fiber reinforced plastic, comprising:
   a tubular main body portion that is centered at an axis;
   a connection portion which has a larger diameter than the main body portion and to which a coupling member is joined; and
   an inclined portion that is formed between the main body portion and the connection portion and that increases in outer diameter while extending from the main body portion toward the connection portion, wherein
   a weak portion that fails when load inputted in an axial direction exceeds a predetermined value is formed in the inclined portion,
   the inclined portion gradually decreases in wall thickness from an end of the inclined portion on the connection portion side toward the other end of the inclined portion on the main body portion side, wherein the wall thickness is the smallest at the other end of the inclined portion on the main body portion side, and
   the weak portion is a portion in which the wall thickness of the inclined portion is smallest; and
   the main body portion decreases in outer diameter from a center portion toward one end portion and to the other end portion, and
   an outer peripheral surface of the main body portion is formed to be in a curved shape from one end to the other end.

\* \* \* \* \*